Aug. 11, 1931. J. H. MURCH 1,818,150
ART OF CUTTING CIRCULAR AND OTHER NONRECTANGULAR
BLANKS FROM SHEET METAL
Filed June 16, 1924 2 Sheets-Sheet 1
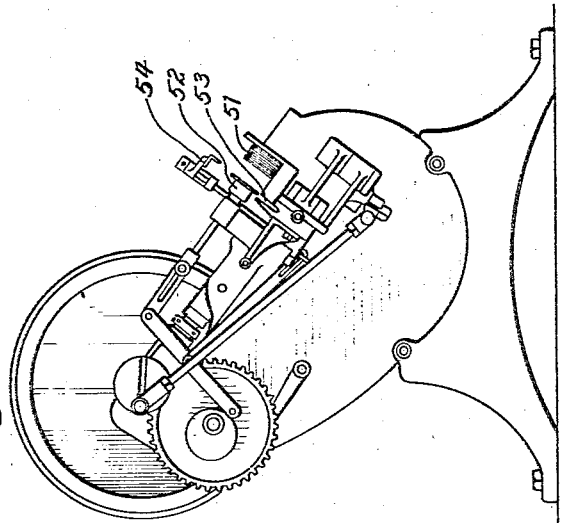
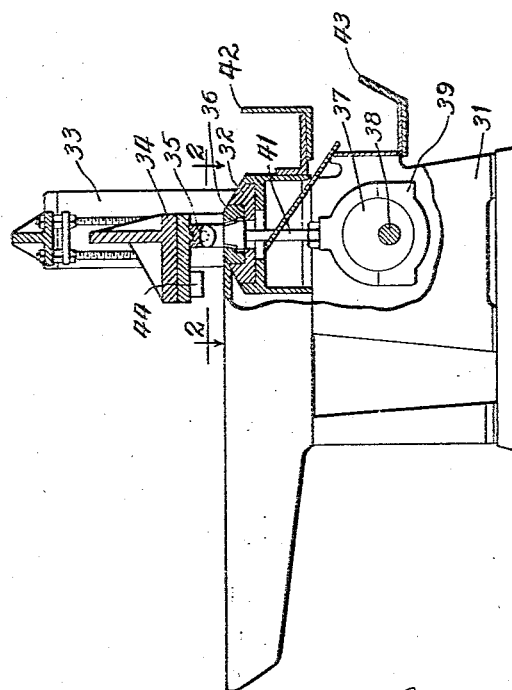
INVENTOR
John H. Murch
BY Munday Clarke &
Carpenter ATTORNEY

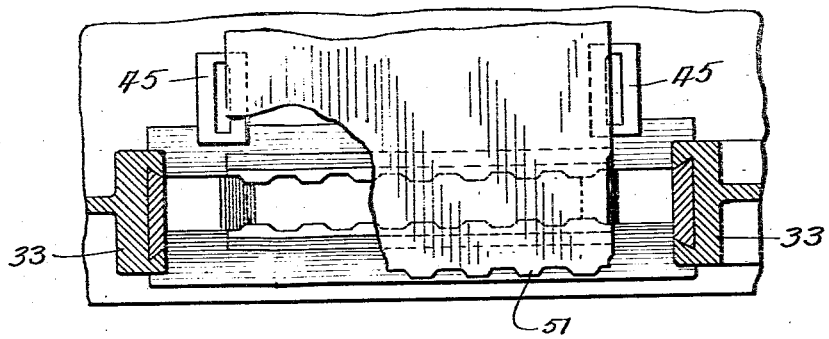
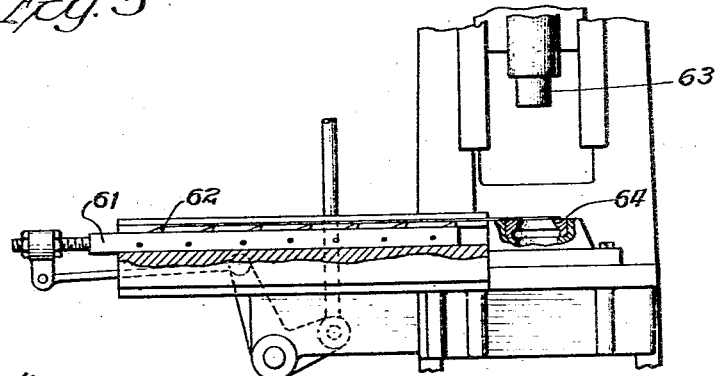
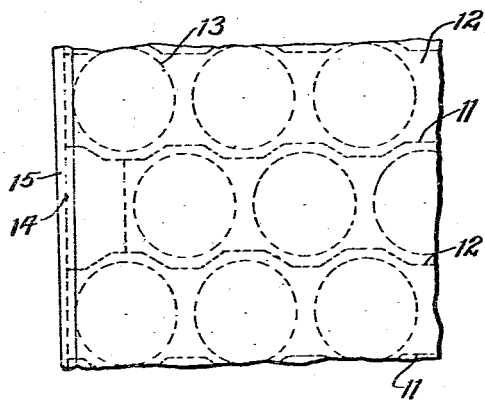
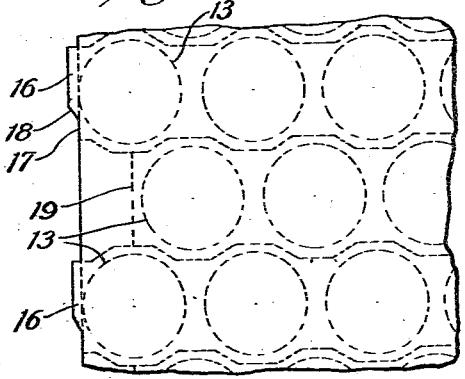

Patented Aug. 11, 1931

1,818,150

UNITED STATES PATENT OFFICE

JOHN H. MURCH, OF EAST ORANGE, NEW JERSEY, ASSIGNOR TO AMERICAN CAN COMPANY, OF NEW YORK, N. Y., A CORPORATION OF NEW JERSEY

ART OF CUTTING CIRCULAR AND OTHER NONRECTANGULAR BLANKS FROM SHEET METAL

Application filed June 16, 1924. Serial No. 720,248.

This invention relates to forming of circular and other non-rectangular objects from sheet material, and while the invention has more particular reference to the cutting and forming of can ends, it will be readily understood that it has much broader and more general application.

A principal object of the present invention is the provision of a method of forming the can ends or other objects which will effect a substantial saving of the sheet material.

In the cutting of round, oval and other duplicate articles from sheet metal such as can ends, etc., the sheet is first cut into strips and these strips fed through a strip feed press to cut the blanks of the articles and form them. In order that wastage may be reduced to a minimum, these strips are cut by what is known in the industry as staggered row layout. In accordance with this layout the outlines of the articles to be cut, usually of circular form, are arranged in rows across the sheet, the members in each row being staggered with respect to the members of the rows immediately above and beneath, so that across the sheet the top and bottom of one outline extends in toward the space between the adjacent outlines of the immediately adjacent rows. When the strips are cut, a cut is made along a scroll or undulating line which provides enlarged portions in each row from which the articles are to be cut. Because of these undulations and the varying widths, accurate arrangement and feeding of the strips in the strip feed press is necessary. In the past it was required that each sheet be trimmed at its ends to provide accurate reference edges for the press feed members to engage in correct relationship with the dies. This trimming of the edges has resulted in an average wastage of one-eighth inch on each side of the sheet or a total wastage of the equivalent of one-fourth inch wide and having a length the width of the sheet. In the can making industry the number of articles made is, of course, enormous and this wastage on this account is an item of real magnitude.

My invention contemplates the provision for accurate edge reference and engagement without requiring the trimming of the sheet or wastage above mentioned.

Numerous other objects and advantages of the invention will be apparent as it is better understood from the following description, which, taken in connection with the accompanying drawings, discloses a preferred embodiment thereof.

Referring to the drawings,

Figure 1 is a side elevation, partially in section, of a shearing machine;

Fig. 1ª is an end elevation of a strip feed press;

Fig. 2 is an enlarged partial plan section on the line 2—2 of Fig. 1;

Fig. 3 is an enlarged detail of the strip feed press; and

Figs. 4 and 5 are fragmentary views illustrating the staggered layout and the cutting of the sheet in accordance with my improved method of preparing the strips for the strip feed press.

In accordance with the staggered layout the sheet of tin plate or other material is cut into strips along lines 11 and 12, said lines 11 and 12 being broken or of scroll character to accommodate lines of die action 13, enlargements, as shown, being alternately positioned in adjacent rows across the sheet.

Prior to my invention it has been necessary to trim along the line 14 at each side of the sheet to remove the strip 15 of approximately one-eighth inch width and in the use of my present invention this trimming is not performed and more of the sheet is preserved for useful cutting. The staggered arrangement provides for the cuts extending nearly to the edge of the sheet on each side in alternate rows (see top and bottom rows in Figs. 4 and 5). There must or should be left about one-eighth inch between the line 13 of the strip feed press die cut and the edge of the sheet. That is to say, the dies in the strip feed press require approximately one-eighth inch of material outside the cut for proper functioning. This last mentioned material is in addition to the trimming already described so that the dies of the strip feed press cut in accordance with prior practice a quarter of an inch from the sheet edge.

In accordance with my present invention I propose to notch these alternate strips, as indicated at 17, cutting back one-eighth inch at a corner, leaving the part 16 at the end of the longitudinal center of the strip. Preferably the notch is angled off at 18 into the uncut part of the strip. The notching of the sheet in this manner produces trimmed and accurate feeding edges at an end of each alternate strip and eliminates the necessity of trimming the sheet as hereinbefore described, since it is unimportant whether the remaining edge of the unnotched portion of the strip be entirely accurate if the bottom of the notch may be engaged by the feeding members of the strip feed press for feeding the strips.

The notch may be conveniently provided by cutting away the material across the ends of intermediate strips, as will be presently more fully described. An accurate reference edge is provided for the strips intermediate those having the notched edges by cutting on lines 19 one-eighth inch away from the die line of cut 13.

The reference numeral 31 indicates the frame of the shear upon which is supported a bed 32 and an arbor 33 in which a cross head 34 is mounted. This cross head carries a male shear die 35 which moves toward and from a female die 36 fixed in the bed 32. The cross head is caused to reciprocate by an eccentric 37 on a shaft 38 in the frame through an eccentric strap 39 connected by an arm 41 with the cross head. The strips as they are formed fall into receptacles 42 and 43 in the usual manner.

The edge of the strips may be notched conveniently in the shear by male dies 44 arranged on the cross head at the feeding-in side and co-operating female dies 45 in the bed 32 of the shear, each pair of said last mentioned dies cutting between adjacent untrimmed portions 16 as shown in Fig. 5.

After the strips are separated and the ends have been cut to provide the accurate edge reference portions 17 and 19, they are placed in the strip feed press shown in Fig. 1ᵃ. In this figure, reference character 51 indicates a pile of strips which are removed singly by suction devices 52 for edgewise insertion in a feedway or slot 53 by pushers 54. In this slot is a strip advancing bar 61 (Fig. 3) which reciprocates with strokes of length equal to the distance between the centers of adjacent lines of cut 13. This bar is provided with feed fingers or members 62 which engage the reference edge portions 17 and 19 to bring successive enlargements of the strips into accurate relation with cutting and forming dies 63 and 64 of the strip feed press.

Fig. 4 shows the old method of trimming tin plate in preparation for the cutting dies. Fig. 5 illustrates the new method of notching a sheet of tin plate without first trimming it. Under the new method a sheet of tin plate need not be trimmed along the line 14, and the broken circular line 13 representing the die cut can be moved up to the line 14, and thus the size of the whole sheet of tin plate can be ordered from the tin plate mills correspondingly smaller. The notches 17 are formed in the part 15 which was formerly trimmed off.

By my new method of notching sheets of tinplate, smaller size sheets of tinplate are required from the tinplate mills and when the saving of tinplate area on one sheet is multiplied by the thousands of sheets used in one can making factory alone the importance of the invention becomes at once apparent.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A method of forming non-rectangular sheet metal articles from a sheet of material, which comprises, cutting the sheet into strips from which a number of said articles may be cut and formed, and as an incident to the cutting operation forming notches in an end of the sheet whereby each strip is formed with an accurate end edge for subsequent feeding, and then feeding the strip through a strip feed press by engagement with the said end edge thereof.

2. The method of forming non-rectangular sheet metal articles from a sheet of material, which comprises, trimming alternate portions from the edge of said sheet preparatory to forming strips with trimmed end edges, cutting said sheet into strips with the alternate untrimmed portions arranged at an end of each alternate strip but not completely across it, and feeding said strips through a strip feed press by engagement with the ends of said strips and at the trimmed portions thereof.

3. A method of forming non-rectangular sheet metal articles from a sheet of material, which comprises, cutting the sheet into alternate longer and shorter strips provided with trimmed ends for the shorter strips and partially trimmed ends for the longer strips, and advancing said strips in a press by engagement with the trimmed edge parts thereof.

4. A method of forming non-rectangular sheet metal articles from a sheet of material, which comprises, trimming portions from an edge of said sheet, cutting said sheet into strips with an untrimmed portion arranged at an end of each alternate strip, but not completely across it, and with a trimmed portion arranged at the same end, and feeding said alternate strips through a strip feed press by the engagement of the ends of said strips and at the trimmed portions thereof.

5. A method of forming non-rectangular sheet metal articles from a sheet of material, which comprises, trimming portions from an edge of said sheet to provide trimmed and untrimmed edges for strips to be cut from said sheet, cutting said sheet into strips and feeding said strips through a strip feed press by the engagement of the ends of said strips at the trimmed portions thereof.

JOHN H. MURCH.